US006169983B1

(12) United States Patent
Chaudhuri et al.

(10) Patent No.: US 6,169,983 B1
(45) Date of Patent: Jan. 2, 2001

(54) INDEX MERGING FOR DATABASE SYSTEMS

(75) Inventors: Surajit Chaudhuri, Redmond; Vivek Narasayya, Bellevue, both of WA (US)

(73) Assignee: Microsoft Corporation, Redmond, WA (US)

( * ) Notice: Under 35 U.S.C. 154(b), the term of this patent shall be extended for 0 days.

(21) Appl. No.: 09/087,617

(22) Filed: May 30, 1998

(51) Int. Cl.$^7$ .................................................. G06F 17/30
(52) U.S. Cl. ........................................ 707/2; 707/3; 707/5
(58) Field of Search .................................. 707/2, 3, 4, 5

(56) References Cited

U.S. PATENT DOCUMENTS

| | | | |
|---|---|---|---|
| 5,440,730 | * 8/1995 | Elmasri et al. | 395/600 |
| 5,644,763 | 7/1997 | Roy | 707/101 |
| 5,685,003 | * 11/1997 | Peltonen et al. | 395/793 |
| 5,737,732 | * 4/1998 | Gibson et al. | 707/2 |
| 5,835,959 | * 11/1998 | McCool et al. | 711/171 |
| 5,950,186 | * 9/1999 | Chaudhuri et al. | 707/2 |
| 6,014,663 | * 1/2000 | Rivette et al. | 707/4 |

OTHER PUBLICATIONS

Caprara, Alberto, et al., "Exact and Approximate Algorithms for the Index Selection Problem in Physical Database Design" *IEEE Transactions on Knowledge and Data Engineering*, vol. 7, No. 6, pp. 955–967 (Dec. 1995).

Chaudhuri, Surajit, et al., "An Efficient, Cost–Driven Index Selection Tool for Microsoft SQL Server," *Proceedings of the 23rd International Conference on Very Large Data Bases (VLDB)*, Athens, Greece, pp. 146–155 (Aug. 25–29, 1997).

Choenni, Sunil, et al., "A Framework for a Tool for Physical Database Design," *Proceedings of Computing Science in the Netherlands*, pp. 96–107 (1992).

Choenni, Sunil, et al., "On the Automation of Physical Database Design," *Proceedings of the ACM Symposium on Applied Computing (SAC)*, pp. 358–367 (Feb. 1993).

Choenni, Sunil, et al., "Index Selection in Relational Databases," *Proceedings of the Fifth International Conference on Computing and Information (ICCI)*, IEEE Computer Society, Sudbury, Ontario, Canada, pp. 491–496 (May 27–29, 1993).

Choenni, Sunil, et al., "On the Selection of Secondary Indices in Relational Databases," *Data & Knowledge Engineering*, 11, pp. 207–233 (1993).

Corrigan, Peter, et al., *ORACLE Performance Tuning*, O'Reilly & Associates, Inc., pp. 81–86 (1993).

(List continued on next page.)

*Primary Examiner*—John Breene
*Assistant Examiner*—Cheryl Lewis
(74) *Attorney, Agent, or Firm*—Watts, Hoffmann, Fisher & Heinke, Co., L.P.A.

(57) ABSTRACT

An index merge tool helps form, for use by a database server in accessing a database in accordance with a workload of queries, an index configuration or set of indexes that consumes relatively less storage space. The index merge tool identifies from an initial set of indexes one or more combinations of two or more indexes on the same table of the database and merges each identified combination of indexes to form a merged set of indexes. The index merge tool identifies and merges each combination of indexes by identifying and merging one pair of indexes at a time. The index merge tool uses the merged set of indexes as the index configuration for use in executing queries against the database so long as the storage saved by the merged set of indexes exceeds a threshold amount and so long as any increase in the cost to execute queries against the database using the merged set of indexes is limited. Otherwise, the index merge tool uses the initial set of indexes as the index configuration.

40 Claims, 6 Drawing Sheets

OTHER PUBLICATIONS

Finkelstein, S., et al., "Physical Database Design for Relational Databases," *ACM Transactions on Database Systems (TODS)*, vol. 13, No. 1, pp. 91–128 (Mar. 1988).

Frank, Martin R., et al., "Adaptive and Automated Index Selection in RDBMS," *Advances in Database Technology, Proceedings of the Third International Conference on Extending Database Technology (EDBT)*, Vienna, Austria, pp. 277–292 (Mar. 23–27, 1992).

Gupta, Himanshu, et al., "Index Selection for OLAP," *Proceedings of ICDE*, 20 pages (Apr. 7–11, 1997).

Hammer, Michael, et al., "Index Selection in a Self–Adaptive Data Base Management System," *Proceedings of the ACM SIGMOD Conference*, Washington, D.C., pp. 93–101 (Jun. 1976).

Harinarayan, Venky, et al., "Implementing Data Cubes Efficiently," *Proceedings of the ACM SIGMOD Conference*, pp. 205–216 (1996).

Hobbs, Lilian, et al., *Rdb/VMS: A Comprehensive Guide*, Digital Press, pp. vii–x and 289–298 (1991).

Labio, Wilburt Juan, et al., "Physical Database Design for Data Warehouses," *Proceedings of ICDE*, 30 pages (Apr. 7–11, 1997).

Olken, Frank, et al., "Simple Random Sampling from Relational Databases," *Proceedings of the Twelfth International Conference on Very Large Data Bases (VLDB)*, Kyoto, pp. 160–169 (Aug. 1986).

Olken, Frank, et al., "Random Sampling from Databases—A Survey," Information and Computing Sciences Div., Lawrence Berkeley Laboratory, Berkeley, California, pp. 1–55 (Mar. 1994).

Ross, Kenneth A., et al., "Materialized View Maintenance and Integrity Constraint Checking: Trading Space for Time," *Proceedings of the ACM SIGMOD Conference*, pp. 447–458 (Apr. 1996).

Rozen, Steve, et al., "A Framework for Automating Physical Database Design," *Proceedings of the Seventeenth International Conference on Very Large Data Bases (VLDB)*, Barcelona, Spain, pp. 401–411 (Sep. 1991).

Stonebraker, Michael, "Hypothetical Data Bases as Views," *Proceedings of the ACM SIGMOD Conference*, pp. 224–229 (1981).

Shamkant Navathe, et al. ACM Transactions on Database Systems, "*Vertical Partitioning Algorithms for Database Design*", vol. 9, No. 4, pp. 680–710 (Dec. 1984).

Shamkant Navathe et al., Database Systems Research and Development Center, Computer and Information Science Dept. *Vertical Partitioning for Database Design: A Graphical Algorithm*, pp. 440–450 (1989).

Salvatore T. March, Computing Surveys, "*Techniques for Structuring Database Records*" vol. 15, No., 1 pp. 45–79 (Mar. 1983).

Jeffrey A. Hoffer, et al., Proceedings of the International Conf., on Very Large Databases: "*The Use of Cluster Analysis in Physical Data Base Design*", vol. 1, No. 1 pp. 69–86 (Sep. 22–24, 1975).

Michael Hammer et al., International Conference on Management of Data, "*A Heuristic Approach to Attribute Partitioning*" pp. 93–101 (May 30–Jun. 1, 1979).

Prabuddha De, et al., Inform. Systems, "*An Integrated Model of Record Segmentation and Access Path Selection for Databases*" vol. 13, No. 1, pp. 13–30, (1988).

Douglas W. Cornell et al., Proceedings Third International Conf. On Data Engineering, "*A Vertical Partitioning Algorithm for Relational Databases*"., pp. 30–35, (Feb. 3–5, 1987).

Pai–Cheng Chu, Information Systems, "*A Transaction–Oriented Approach to Attribute Partitioning*", vol. 17, No. 4 pp. 329–342, (1992).

Don Slutz, Proceedings of the 24th Annual International Conf., on Very Large Databases, *Massive Stochastic Testing of SQL*, pp. 618–622, (Aug. 24–27, 1998).

* cited by examiner

INDEX MERGING FOR DATABASE SYSTEMS

FIELD OF THE INVENTION

The present invention relates generally to the field of database systems. More particularly, the present invention relates to the field of indexing data for database systems.

BACKGROUND OF THE INVENTION

Computer database systems manage the storage and retrieval of data in a database. A database comprises a set of tables of data along with information about relations between the tables. Tables represent relations over the data. Each table comprises a set of records of data stored in one or more data fields. The records of a table are also referred to as rows, and the data fields of records in a table are also referred to as columns.

A database server processes data manipulation statements or queries, for example, to retrieve, insert, delete, and update data in a database. Queries are defined by a query language supported by the database system. To enhance performance in processing queries, database servers use indexes to help access data in a database more efficiently.

The number of possible indexes over a database, however, can be very large and significantly increase the storage requirements for the database. Also, many of the possible indexes may provide no or minimal performance advantage considering the data in the database, the organization of the data in the database, and the usage of the database as represented by a workload of queries executed against the database. A physical database design tool or database administrator therefore strives to form an index configuration or set of indexes that is not only effective in enhancing performance in processing queries but also consumes less storage space.

SUMMARY OF THE INVENTION

An index merge tool helps form, for use by a database server in accessing a database in accordance with a given workload of queries, an index configuration or set of indexes that consumes relatively less storage space. The index merge tool attempts to merge indexes of an initial set of indexes to help minimize the amount of storage space consumed by the indexes while minimizing any increase in the cost of executing queries of the workload against the database using the indexes. The index merge tool identifies from the initial set of indexes one or more combinations of two or more indexes on the same table of the database and merges each identified combination of indexes. The index merge tool may identify and merge each combination of indexes by identifying and merging one pair of indexes at a time.

In accordance with the present invention, a method merges indexes for use in executing queries against a database. The method may be implemented in the form of program modules or computer-executable instructions stored on a computer readable medium.

For the method, at least two indexes are identified from an initial set of indexes and merged to form a merged index set consuming less storage space than for the initial set of indexes. One or more combinations of two or more indexes on the same table of the database may be identified from the initial set of indexes, and each identified combination of indexes may be merged to form the merged index set. Of the initial set of indexes, the method may possibly merge only indexes of a subset of the initial index set that have a width of at least a predetermined number of column(s) and/or that are for index-only access.

Each combination of indexes may be identified and merged one pair of indexes at a time. Each pair of indexes may be merged such that all columns of one index of the pair are ordered ahead of any different columns of the other index of the pair. The order of columns may be determined based on how the indexes of each pair rank against one another. The method may possibly merge only pairs of indexes that will form a merged index having a width less than a predetermined percentage greater than that for each index of the pair used to form the merged index. The method may also possibly merge only pairs of indexes where the initial set of indexes comprises a single-column index on a leading column of both indexes of the pair and the leading column of each index of the pair are the same or where the initial set of indexes comprises a single-column index on only one or none of the leading columns of the indexes of the pair.

The merged index set is used to execute queries against the database if the storage space consumed by the merged index set is at least a predetermined percentage less than that for the initial set of indexes and/or if an estimated cost to execute queries of a workload for the merged index set is less than a predetermined percentage greater than an estimated cost to execute the queries of the workload for the initial set of indexes.

For another method, a subset of indexes on one table of a database is identified from an initial set of indexes. An initial subset of indexes that have a width of at least a predetermined number of column(s) and/or that are for index-only access may be identified from the initial set of indexes. The subset of indexes on one table of the database may be identified from the initial subset of indexes.

Each of one or more combinations of indexes from the identified subset of indexes are merged to form a set of one or more respective merged indexes. Each combination of indexes may be a pair of indexes.

Each combination of indexes may be merged such that all columns of one index of the combination are ordered ahead of any different columns of the other index(es) of the combination to form the respective merged index. The order of columns for each respective merged index may be determined based on how the indexes of the combination used to form the respective merged index rank against one another. Indexes of each combination may be ranked based on how a leading column of each index of the combination appears in one or more queries. Each index of each combination may be ranked with a highest rank if one or more queries have a condition on the leading column of the index, with a second highest rank if one or more queries have an order by clause on the leading column of the index, with a third highest rank if one or more queries have a group by clause on the leading column of the index, and with a fourth highest rank if one or more queries use the leading column of the index as a projection column.

The method may possibly merge only combinations of indexes that will form a merged index having a width less than a predetermined percentage greater than that for each index of the combination used to form the merged index. The method may also possibly merge only combinations of indexes where the initial set of indexes comprises a single-column index on a leading column of at least two indexes of the combination and the leading column of those at least two indexes of the combination are the same or where the initial set of indexes comprises a single-column index on only one or none of the leading columns of the indexes of the combination.

A merged index is selected from the set of one or more merged indexes. The merged index that saves the most storage space, for example, may be selected. The combination of indexes used to form the selected merged index is replaced with the selected merged index.

The merging, selection, and replacement of indexes is repeated one or more times for the subset of indexes on the current table. The method is similarly performed for each of one or more other tables of the database on which the initial set of indexes are indexed to form a merged index set.

The merged index set is used to execute queries against the database if the storage space consumed by the merged index set is at least a predetermined percentage less than that for the initial set of indexes and/or if an estimated cost to execute queries of a workload for the merged index set is less than a predetermined percentage greater than an estimated cost to execute the queries of the workload for the initial set of indexes.

Another method merges a pair of indexes to form a merged index for use in executing queries against a database.

For this method, one of the indexes of the pair is selected to precede the other index of the pair. How the indexes of the pair rank against one another may be determined, and the index of the pair that ranks higher against the other index of the pair may be selected. The indexes of the pair may be ranked based on how a leading column of each index of the pair appears in one or more queries. Each index of the pair may be ranked with a highest rank if one or more queries have a condition on the leading column of the index, with a second highest rank if one or more queries have an order by clause on the leading column of the index, with a third highest rank if one or more queries have a group by clause on the leading column of the index, and with a fourth highest rank if one or more queries use the leading column of the index as a projection column.

The pair of indexes are merged such that all columns of the selected index are ordered ahead of any different columns of the other index of the pair to form the merged index.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An index merge tool in accordance with the present invention helps form, for use by a database server in accessing a database in accordance with a workload of queries, an index configuration or set of indexes that consumes relatively less storage space.

Exemplary Operating Environment

Figure 1:
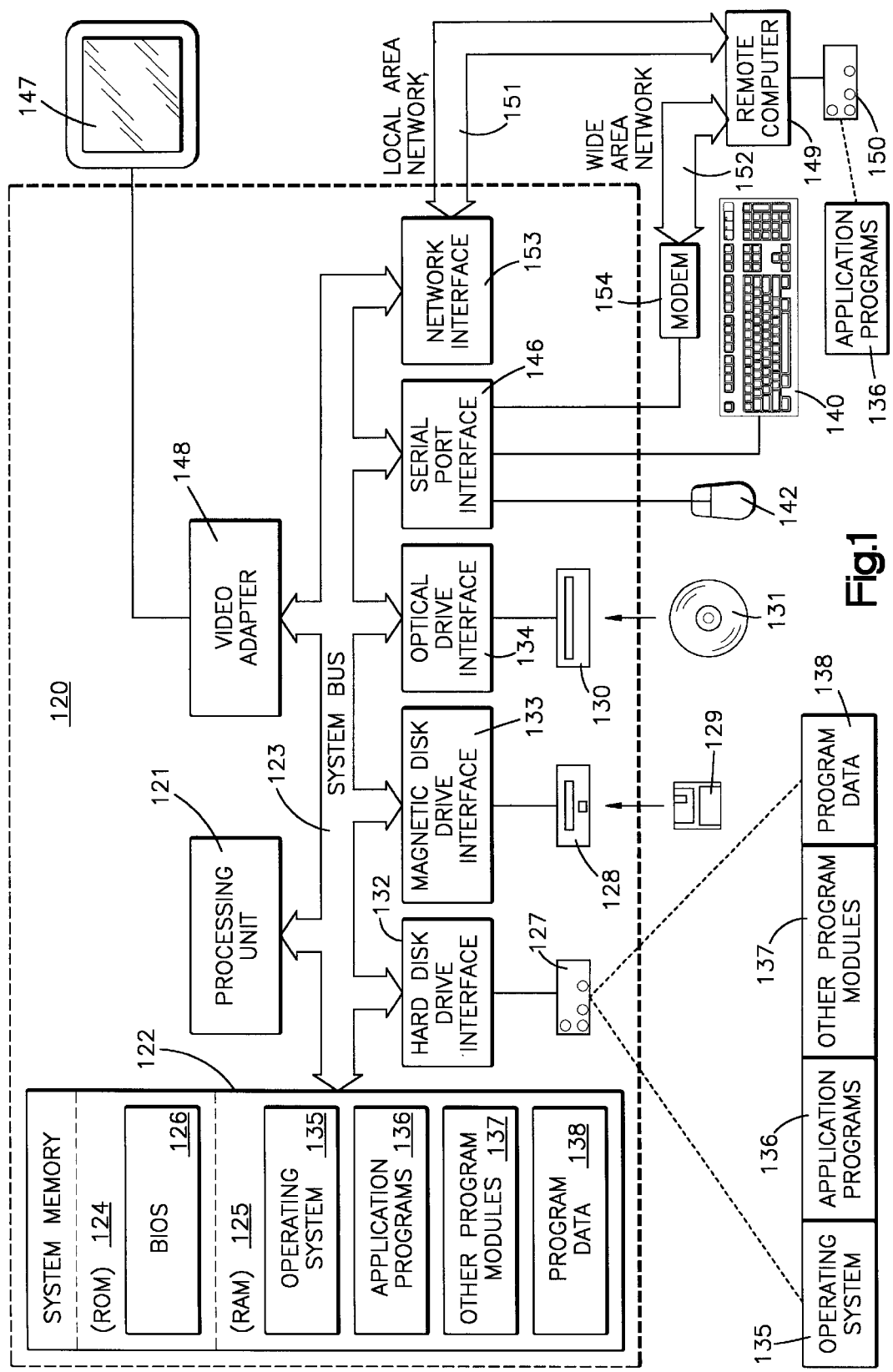
FIG. 1 illustrates an exemplary operating environment for merging indexes for a database system.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, containing the basic routines that help to transfer information between elements within personal computer 120, such as during start-up, is stored in ROM 124. Personal computer 120 further includes a hard disk drive 127 for reading from and writing to a hard disk, a magnetic disk drive 128 for reading from or writing to a removable magnetic disk 129, and an optical disk drive 130 for reading from or writing to a removable optical disk 131 such as a CD ROM or other optical media. Hard disk drive 127, magnetic disk drive 128, and optical disk drive 130 are connected to system bus 123 by a hard disk drive interface 132, a magnetic disk drive interface 133, and an optical drive interface 134, respectively. The drives and their associated computer-readable media provide nonvolatile storage of computer-readable instructions, data structures, program modules and other data for personal computer 120. Although the exemplary environment described herein employs a hard disk, a removable magnetic disk 129 and a removable optical disk 131, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into personal computer 120 through input devices such as a keyboard 140 and pointing device 142. Other input devices may include a microphone, joystick, game pad, satellite dish, scanner, or the like. These and other input devices are often connected to processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as a video adapter 148. In addition to the monitor, personal computers typically include other peripheral output devices, such as speakers and printers.

Personal computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, personal computer 120 is connected to local network 151 through a network interface or adapter 153. When used in a WAN networking environment, personal computer 120 typically includes a modem 154 or other means for establishing communications over wide area network 152, such as the Internet. Modem 154, which may be internal or external, is connected to system bus 123 via serial port interface 146. In a networked environment, program modules depicted relative to personal computer 120, or portions thereof, may be stored in remote memory storage device 150. It will be appreciated that the network connections shown are exemplary and other means of establishing a communications link between the computers may be used.

Database System

Figure 2:
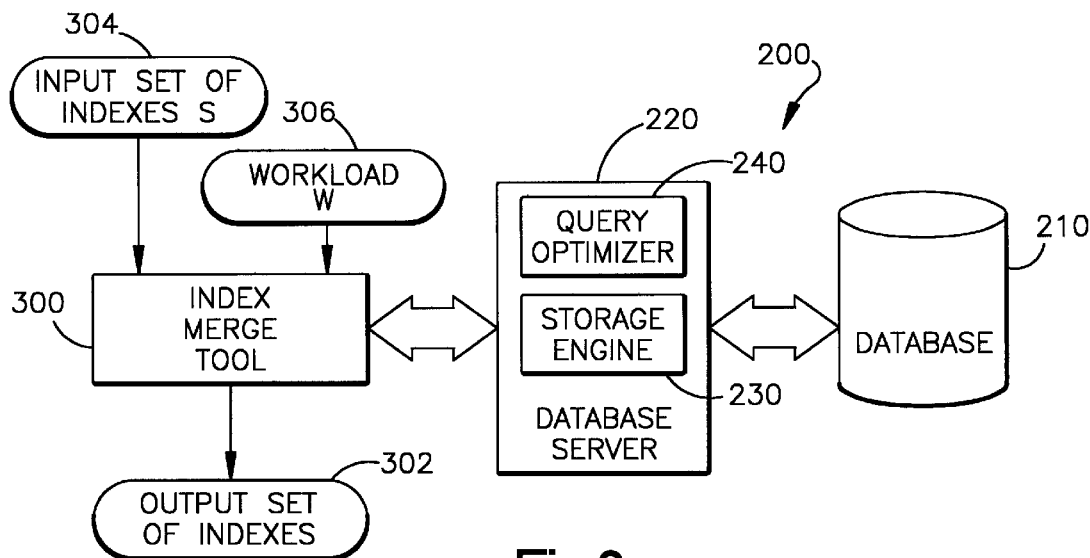
FIG. 2 illustrates, for one embodiment, a database system comprising an index merge tool, a database server, and a database.

FIG. 2 illustrates for one embodiment a computer database system 200 comprising a database 210, a database server 220, and an index merge tool 300. Database system 200 manages the storage and retrieval of data in database 210 in accordance with data manipulation statements or queries presented to database system 200 by a database application or by a user, for example.

Database 210 comprises a set of tables of data along with information about relations between the tables. Tables represent relations over the data. Each table comprises a set of records of data stored in one or more data fields. The records of a table are also referred to as rows, and the data fields of records in a table are also referred to as columns.

Database server 220 processes queries, for example, to retrieve, insert, delete, and/or update data in database 210. Database system 200 may support any suitable query language, such as Structured Query Language (SQL) for example, to define the queries that may be processed by database server 220. Suitable SQL queries include, for example, Select, Insert, Delete, and Update.

Database server 220 comprises a storage engine 230 for accessing data in database 210. To enhance performance in processing queries, database server 220 also comprises a query optimizer 240 that uses indexes of an index configuration 302 to help access data in database 210 more efficiently. An index configuration is a set of indexes. An index may be single-column or multi-column and may be clustered or non-clustered. The possible indexes that may be included in index configuration 302 depends, for example, on the data of database 210.

Index merge tool 300 forms and outputs index configuration 302 for use by database server 220 from an input set of indexes S 304 in accordance with a workload W 306 and query optimizer 240 of database server 220. Workload W 306 comprises a set of queries to be executed against database 210. For embodiments supporting SQL queries, workload W 306 may be generated using SQLTrace utility, for example.

Database server 220, storage engine 230, query optimizer 240, and index merge tool 300 for one embodiment are each implemented as program modules or computer-executable instructions and may be stored on any suitable computer-readable medium for execution in a suitable operating environment, such as the computing environment of FIG. 1 for example. The data of database 210, index configuration 302, set of indexes S 304, and workload W 306 may be implemented in the form of one or more suitable data structures and may also be stored on any suitable computer-readable medium.

Index Merge Tool

Given the queries of workload W 306, index merge tool 300 attempts to merge indexes of the set of indexes S 304 to help minimize the amount of storage space consumed by an index configuration for database system 200 while minimizing any increase in the cost of executing queries of workload W 306 against database 210 using the index configuration.

Index merge tool 300 may be used for one embodiment to merge indexes of an index configuration selected using the index selection tool described in U.S. patent application Ser. No. 08/912,036, U.S. Pat. No. 5,950,186, filed Aug. 15, 1997, entitled DATABASE SYSTEM INDEX SELECTION USING COST EVALUATION OF A WORKLOAD FOR MULTIPLE CANDIDATE INDEX CONFIGURATIONS, by Surajit Chaudhuri and Vivek Narasayya; in U.S. patent application Ser. No. 08/980,830, U.S. Pat. No. 5,960,423, filed Dec. 1, 1997, entitled DATABASE SYSTEM INDEX SELECTION USING CANDIDATE INDEX SELECTION FOR A WORKLOAD, by Surajit Chaudhuri and Vivek Narasayya; in U.S. patent application Ser. No. 08/982,046, U.S. Pat. No. 5,913,207, filed Dec. 1, 1997, entitled DATABASE SYSTEM INDEX SELECTION USING INDEX CONFIGURATION ENUMERATION FOR A WORKLOAD, by Surajit Chaudhuri and Vivek Narasayya; in U.S. patent application Ser. No. 08/980,831, U.S. Pat. No. 5,913,206, filed Dec. 1, 1997, entitled DATABASE SYSTEM MULTI-COLUMN INDEX SELECTION FOR A WORKLOAD, by Surajit Chaudhuri and Vivek Narasayya; in U.S. patent application Ser. No. 08/980,829, U.S. Pat. No. 5,926,813, filed Dec. 1, 1997, entitled DATABASE SYSTEM INDEX SELECTION USING COST EVALUATION OF A WORKLOAD FOR MULTIPLE CANDIDATE INDEX CONFIGURATIONS, by Surajit Chaudhuri and Vivek Narasayya; and in the conference paper, Surajit Chaudhuri and Vivek Narasayya, "An Efficient, Cost-Driven Index Selection Tool for Microsoft SQL Server," *Proceedings of the 23rd International Conference on Very Large DataBases* (*VLDB*), Athens, Greece, pp. 146–155 (Aug. 25–29, 1997). These patent applications and this conference paper are each herein incorporated by reference.

Figure 3:
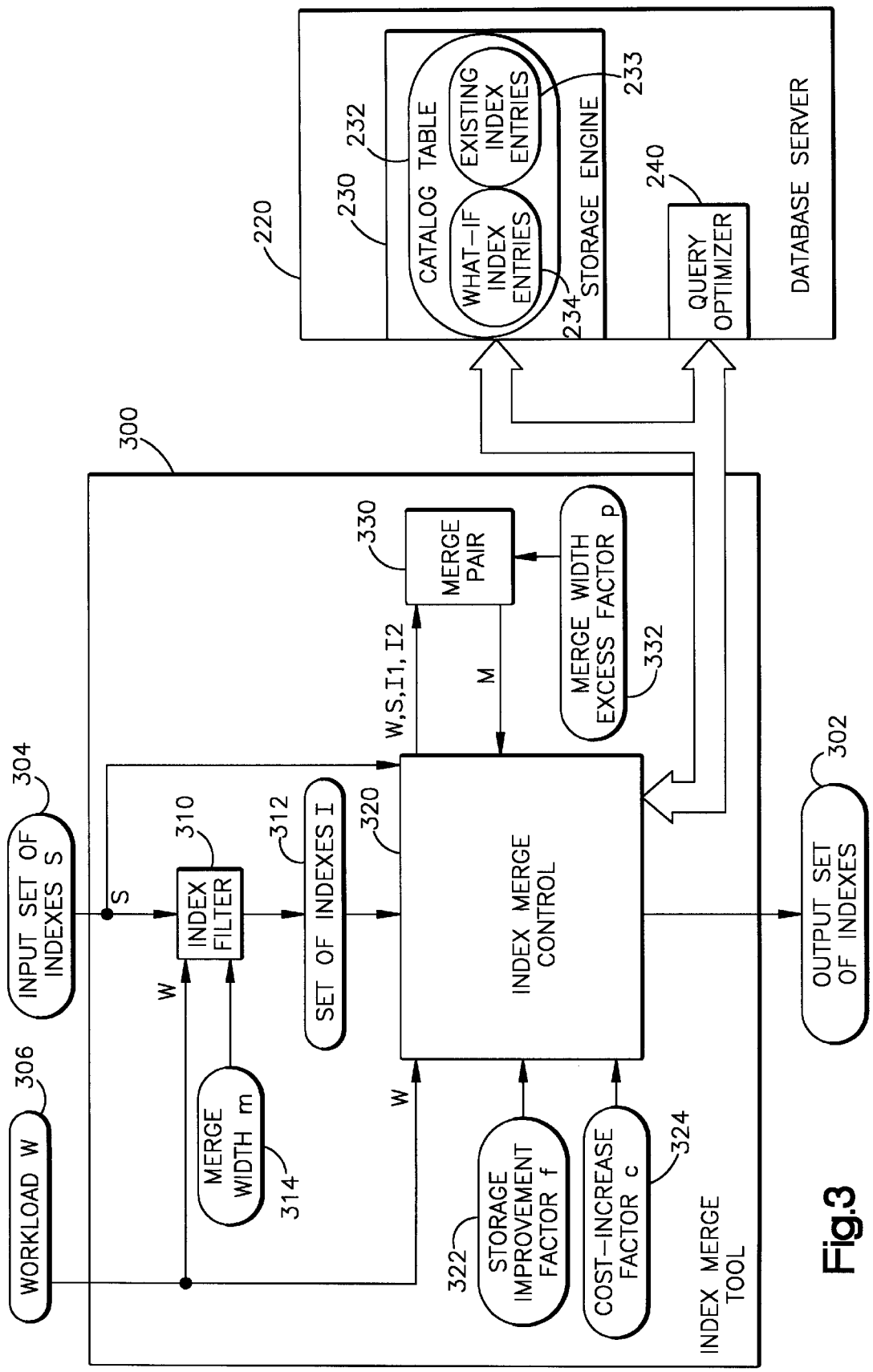
FIG. 3 illustrates, for one embodiment, the index merge tool and database server for the database system of FIG. 2.

Index merge tool 300 for one embodiment comprises an index filter 310, an index merge control tool 320, and a merge pair tool 330, as illustrated in FIG. 3. Index filter 310, index merge control tool 320, and merge pair tool 330 for one embodiment are each implemented as program modules or computer-executable instructions and may be stored on any suitable computer-readable medium for execution in a suitable operating environment, such as the computing environment of FIG. 1 for example. Index merge tool 300 for one embodiment merges indexes in accordance with a flow diagram 400 of FIG. 4 to form index configuration 302.

Figure 4:
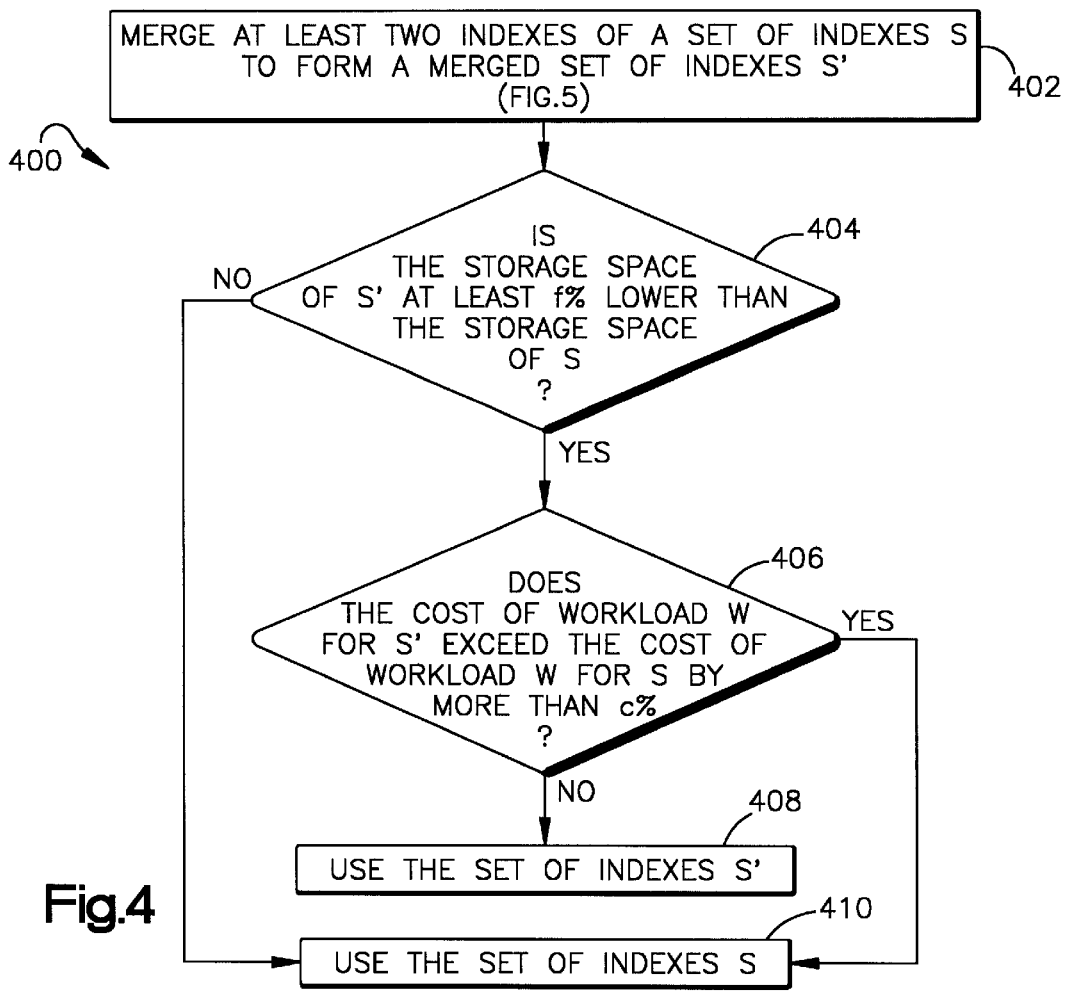
FIG. 4 illustrates, for one embodiment, a flow diagram for determining whether to use a merged index set for a database system.

For step 402 of FIG. 4, index merge tool 300 merges at least two indexes of the set of indexes S 304 to form a merged set of indexes S' such that the merged set of indexes S' consumes less storage space than that consumed by the set of indexes S 304. Index merge tool 300 merges one or more combinations of two or more indexes of the set of indexes S 304 to form the merged set of indexes S'. Index merge tool 300 for one embodiment for step 402 merges one or more combinations of two or more indexes of the set of indexes S 304 one pair of indexes at a time in accordance with the flow diagram of FIG. 5 to form the merged set of indexes S'.

Figure 5:
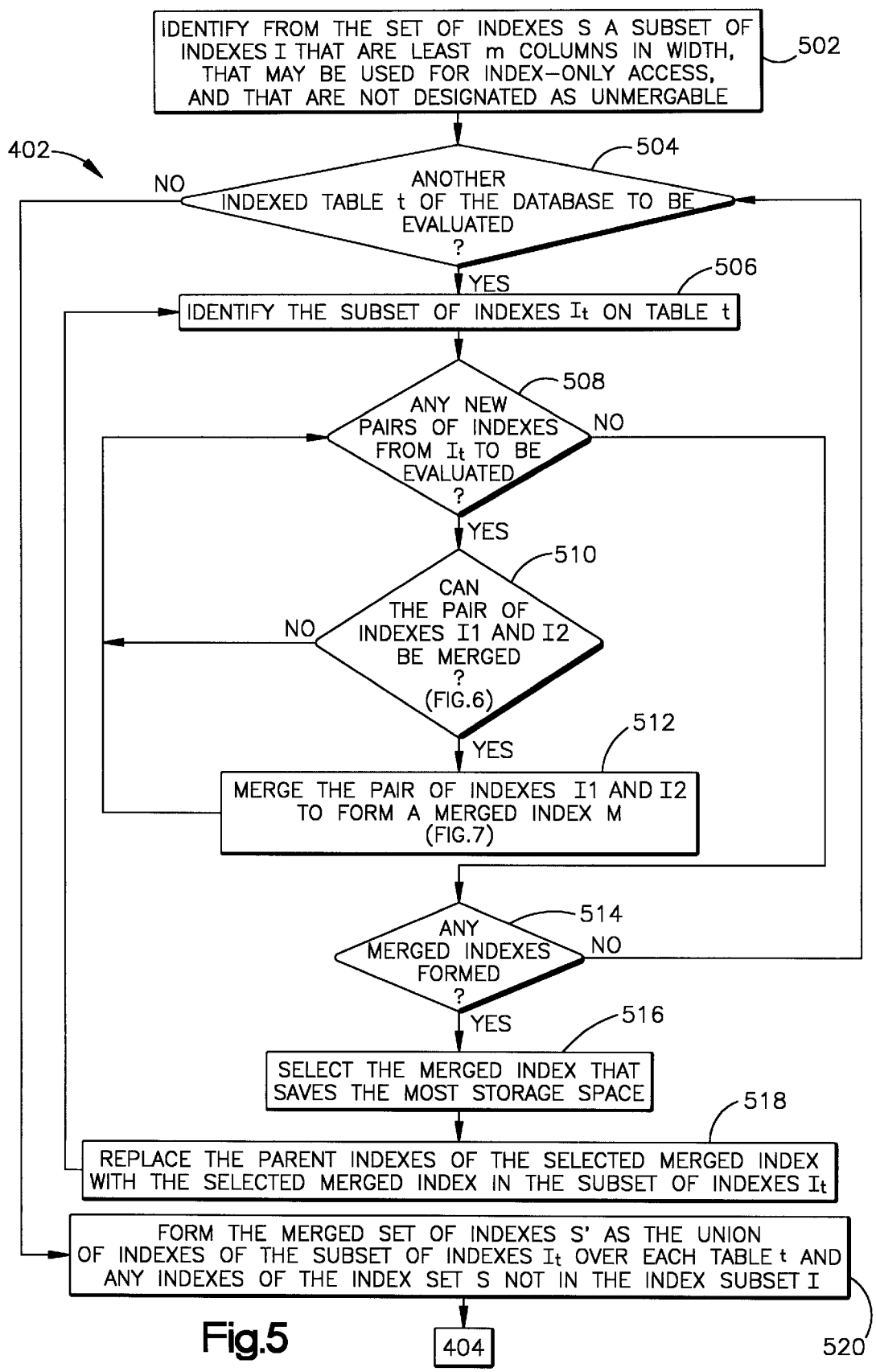
FIG. 5 illustrates, for one embodiment, a flow diagram for merging indexes of a set of indexes to form a merged index set for the flow diagram of FIG. 4.

For step 502 of FIG. 5, index filter 310 identifies from the set of indexes S 304 a subset of indexes I 312 that may be merged to form the merged set of indexes S'. Index filter 310 may identify the subset of indexes I 312 using any suitable criteria.

Index filter 310 for one embodiment determines the subset of indexes I 312 as any indexes of the set of indexes S 304 that are at least a predetermined number m column(s) in width, where m is a merge width 314 as illustrated in FIG. 3. Merge width m 314 may be any suitable integer and for one embodiment is 3. Merge width m 314 for one embodiment may be defined by a user of index merge tool 300. By considering only indexes having a width greater than or equal to m column(s) for merging, index merge tool 300 presumes indexes less than m columns in width may be significant for conditions, such as selections and joins for example, and therefore avoids merging such indexes.

Index filter 310 may also determine the subset of indexes I 312 as any indexes of the set of indexes S 304 that would help database server 220 answer queries using only indexes without having to access any tables of database 210. That is, index filter 310 may also consider indexes, that help index-only access. Index merge tool 300 may consider only indexes that help index-only access for merging to preserve the presumptively significant ordering of columns for indexes that do not help index-only access. Index filter 310 may determine the subset of indexes I 312 in this manner based on the queries of workload W 306. Index filter 310 may further determine the subset of indexes I 312 as any indexes of the set of indexes S 304 that are not designated as unmergable. A user of index merge tool 300 for one embodiment may designate one or more indexes as unmergable with a flag, for example, as desired to prevent index merge tool 300 from merging such designated indexes with any other indexes.

Index filter 310 may identify the subset of indexes I 312 using one, two, or all three of these criteria for step 502 and may apply these criteria in any order. Index filter 310 may also identify the subset of indexes I 312 using any of these criteria in combination with any other suitable criteria.

For steps 504, 506, 508, 510, 512, 514, 516, and 518 of FIG. 5, index merge control tool 320 attempts to merge indexes of the subset I 312 on one table of database 210 at a time. Index merge control tool 320 for step 504 determines whether indexes of the subset I 312 on any one table t of database 210 have yet to be evaluated and, if so, identifies the table t. Index merge control tool 320 for step 506 identifies a subset of indexes $I_t$ on the identified table t and for steps 508, 510, 512, 514, 516, and 518 attempts to merge two indexes of the subset $I_t$ and replace those two indexes in the subset It with the resulting merged index. Index merge control tool 320 for steps 508, 510, and 512 evaluates every possible pair of indexes of the subset $I_t$ for merging and for steps 514, 516, and 518 selects the merged index resulting from one of the evaluated pair(s) of indexes for replacement in the subset It provided any pairs of indexes of the subset $I_t$ can be merged.

For step 508, index merge control tool 320 determines whether any possible pairs of indexes of the subset $I_t$ have yet to be evaluated and, if so, identifies a pair of indexes I1 and I2 of the subset $I_t$ for evaluation. Index merge control tool 320 for step 510 invokes merge pair tool 330 to determine whether the identified pair of indexes I1 and I2 can be merged. As illustrated in FIG. 3, index merge control tool 320 for one embodiment identifies the pair of indexes I1 and I2 for merge pair tool 330. If the identified pair of indexes I1 and I2 can be merged, merge pair tool 330 for step 512 merges the pair of indexes I1 and I2 to form a merged index M for inclusion in a current set of merged indexes. Index merge control tool 320 then proceeds to step 508 to evaluate any other pairs of indexes of the subset $I_t$. If the identified pair of indexes I1 and I2 should not be merged as determined for step 510, merge pair tool 330 bypasses step 512 and index merge control tool 320 proceeds to step 508 to evaluate any other pairs of indexes of the subset $I_t$.

Merge pair tool 330 for step 510 may determine whether identified pairs of indexes I1 and I2 can be merged using any suitable criteria. Merge pair tool 330 for one embodiment determines whether the identified pair of indexes I1 and I2 can be merged in accordance with the flow diagram of FIG. 6.

Figure 6:
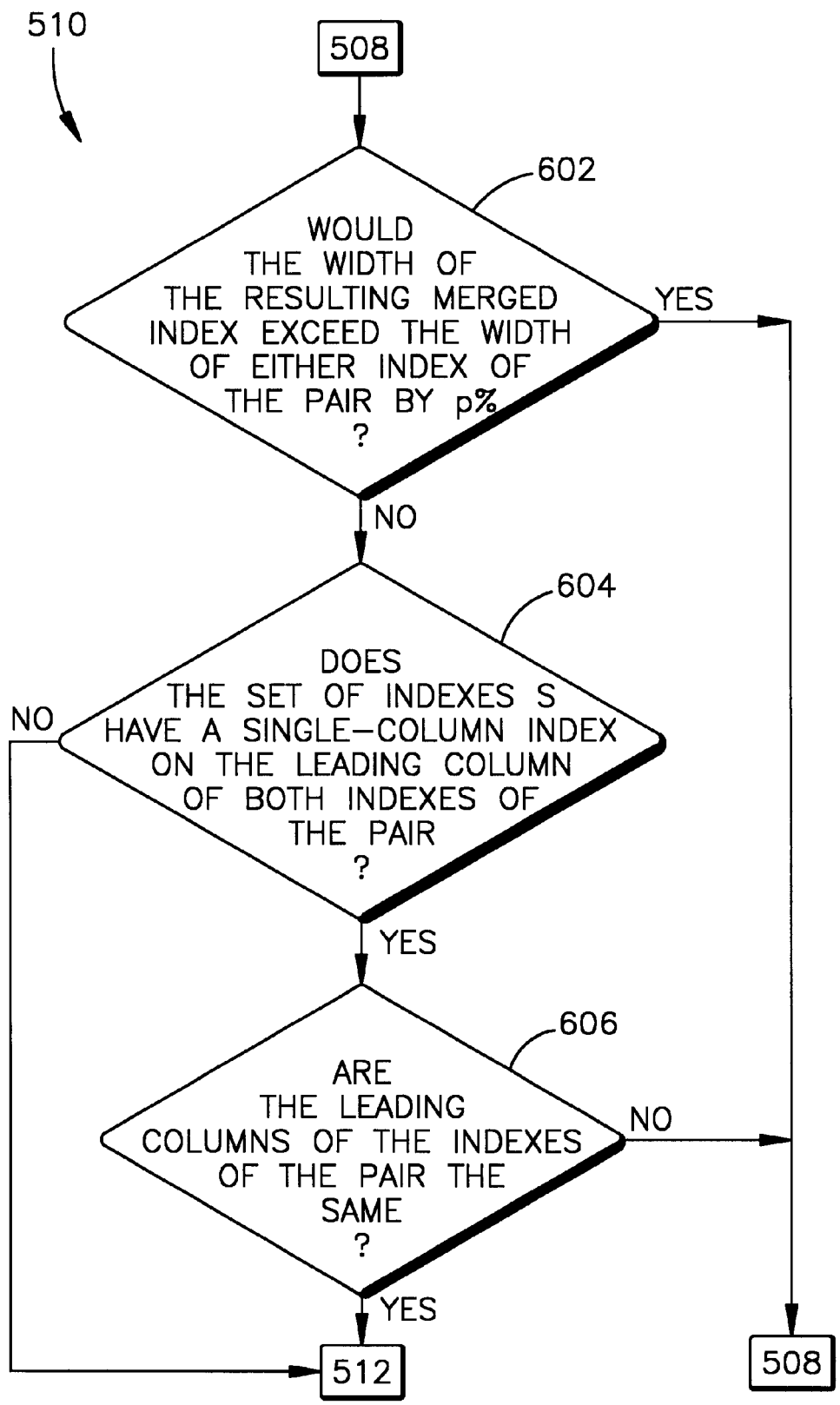
FIG. 6 illustrates, for one embodiment, a flow diagram for determining whether a pair of indexes can be merged for the flow diagram of FIG. 5.

For step 602 of FIG. 6, merge pair tool 330 determines whether the merging of the pair of indexes I1 and I2 would result in a merged index M having a width that exceeds the width of either index I1 or I2 by a predetermined percentage p, where p is a merge width excess factor 332 as illustrated in FIG. 3. That is, merge pair tool 330 for step 602 determines whether:

$$\frac{w_M - w_{I1}}{w_{I1}} \le p \text{ and } \frac{w_M - w_{I2}}{w_{I2}} \le p$$

where $w_{I1}$ is the width of index I1, $w_{I2}$ is the width of index I2, and $w_M$ is the width of the resulting merged index M. Merge width excess factor p 332 may be any suitable number and for one embodiment is approximately 0.35 or 35%. Merge width excess factor p 332 for one embodiment may be defined by a user of index merge tool 300. Merge pair tool 330 for one embodiment measures the width of an index as the sum of the widths of the column(s) for the index in units of bits or bytes.

Merge pair tool 330 for one embodiment for step 602 may compute the width of the resulting merged index M as the sum of the widths of each distinct column of indexes I1 and I2. Index merge control tool 320 may determine column widths for indexes I1 and I2 by reference to existing index entries 233 or what-if index entries 234 of a catalog table 232, as illustrated in FIG. 3, and may identify this width information to merge pair tool 330 in identifying indexes I1 and I2 to merge pair tool 330. Index merge control tool 320 for one embodiment may gather width information for the indexes of the set of indexes S 304 from catalog table 232 upon initialization of index merge tool 300. Merge pair tool 330 may also determine the width of the resulting merged index M by referencing width information for the resulting merged index M from catalog table 232 if catalog table 232 already comprises an index entry for the resulting merged index M.

If merge pair tool 330 determines for step 602 that the merging of the pair of indexes I1 and I2 would result in a merged index M having a width that exceeds the width of either index I1 or I2 by the predetermined percentage p, merge tool pair 330 returns a suitable return code to index merge control tool 320 indicating the pair of indexes I1 and I2 should not be merged. Index merge tool 300 prevents merging such indexes because relatively wide indexes require more scanning time in executing queries against database 210.

As one example where index I1 is [a,b,c], index I2 is [b,c,d,e], the width of each column a, b, c, d, and e is 4 bytes, and the merge width excess factor p is 35%, merge pair tool 330 determines the width $w_{I1}$ of index I1 is 12 bytes, the width $w_{I2}$ of index I2 is 16 bytes, the resulting merged index M is [a,b,c,d,e], and the width $w_M$ of merged index M is 20 bytes. Because merged index M is 67% wider than index I1 ((20−12)/12=0.67), merge pair tool 330 for step 602 would determine indexes I1 and I2 should not be merged even though merged index M is only 25% wider than index I2 ((20−16)/16=0.25).

As another example where index I1 is [a,b,c], index I2 is [b,c,d], the width of each column a, b, c, and d is 4 bytes, and merge width excess factor p is 35%, merge pair tool 330 determines the width $w_{I1}$ of index I1 is 12 bytes, the width $w_{I2}$ of index I2 is 12 bytes, the resulting merged index M is [a,b,c,d], and the width $w_M$ of merged index M is 16 bytes. Because merged index M is only 33% wider than each index I1 and I2 ((16−12)/12=0.33), merge pair tool 330 for step 602 would determine indexes I1 and I2 can be merged subject to any other criteria for step 510.

If the merging of the pair of indexes I1 and I2 would result in a merged index M having a width that does not exceed the width of each index I1 and I2 by the predetermined percentage p, merge pair tool 330 determines for step 604 whether the set of indexes S 304 has a single-column index on the leading column of both indexes I1 and I2 and, if so, determines for step 606 whether the leading columns of both indexes I1 and I2 are the same. Index merge control tool 320 for one embodiment identifies the set of indexes S 304 for merge pair tool 330, as illustrated in FIG. 3. The set of indexes S 304 for another embodiment may be globally accessible within index merge tool 300 and therefore available to merge pair tool 330.

Merge pair tool 330 performs steps 604 and 606 because a column is presumed significant for indexing purposes if the set of indexes S 304 has a single-column index on that column. If the set of indexes S 304 has a single-column index on the leading column of both indexes I1 and I2, then, index merge tool 300 in merging indexes I1 and I2 would forfeit the presumed benefit of having one of those two columns as the leading column of an index unless the two columns were the same.

Merge pair tool 330 returns a suitable return code to index merge control tool 320 indicating the pair of indexes I1 and I2 should not be merged if the set of indexes S 304 has a single-column index on the leading column of both indexes I1 and I2 as determined for step 604 and if the leading columns of both indexes I1 and I2 are not the same as determined for step 606. If the set of indexes S 304 comprises a single-column index on only one or none of the leading columns of the indexes I1 and I2 as determined for step 604 or if the leading columns of both indexes I1 and I2 are the same as determined for step 606, merge pair tool 330 for step 512 merges the pair of indexes I1 and I2.

As one example where index I1 is [a,b,c], index I2 is [b,c,d], and the set of indexes S 304 has a single-column index on column a, or index [a], but does not have a single-column index on column b, or index [b], merge pair tool 330 for step 604 would determine indexes I1 and I2 can be merged because the set of indexes S 304 has a single-column index on the leading column of only one of the indexes I1 and I2. If, however, the set of indexes S 304 has both indexes [a] and [b], merge pair tool 330 would determine for steps 604 and 606 that indexes I1 and I2 should not be merged because the leading columns of indexes I1 and I2 are not the same.

As another example where index I1 is [a,b,c], index I2 is [a,c,d], and the set of indexes S 304 has the index [a], merge pair tool 330 for steps 604 and 606 would determine indexes I1 and I2 can be merged because the leading columns of indexes I1 and I2 are the same.

Merge pair tool 330 may perform step 510 using either one or both criteria for step 602 and the combination of steps 604 and 606. Merge pair tool 330 may perform step 602 and the combination of steps 604 and 606 in any order. Merge pair tool 330 may also perform step 510 using either one or both of these criteria in combination with any other suitable criteria for determining whether a pair of indexes can or should not be merged.

Merge pair tool 330 for step 512 may merge indexes I1 and I2 in any suitable manner to form the merged index M. Merge pair tool 330 for one embodiment for step 512 merges indexes I1 and I2 in accordance with the flow diagram of FIG. 7.

Figure 7:
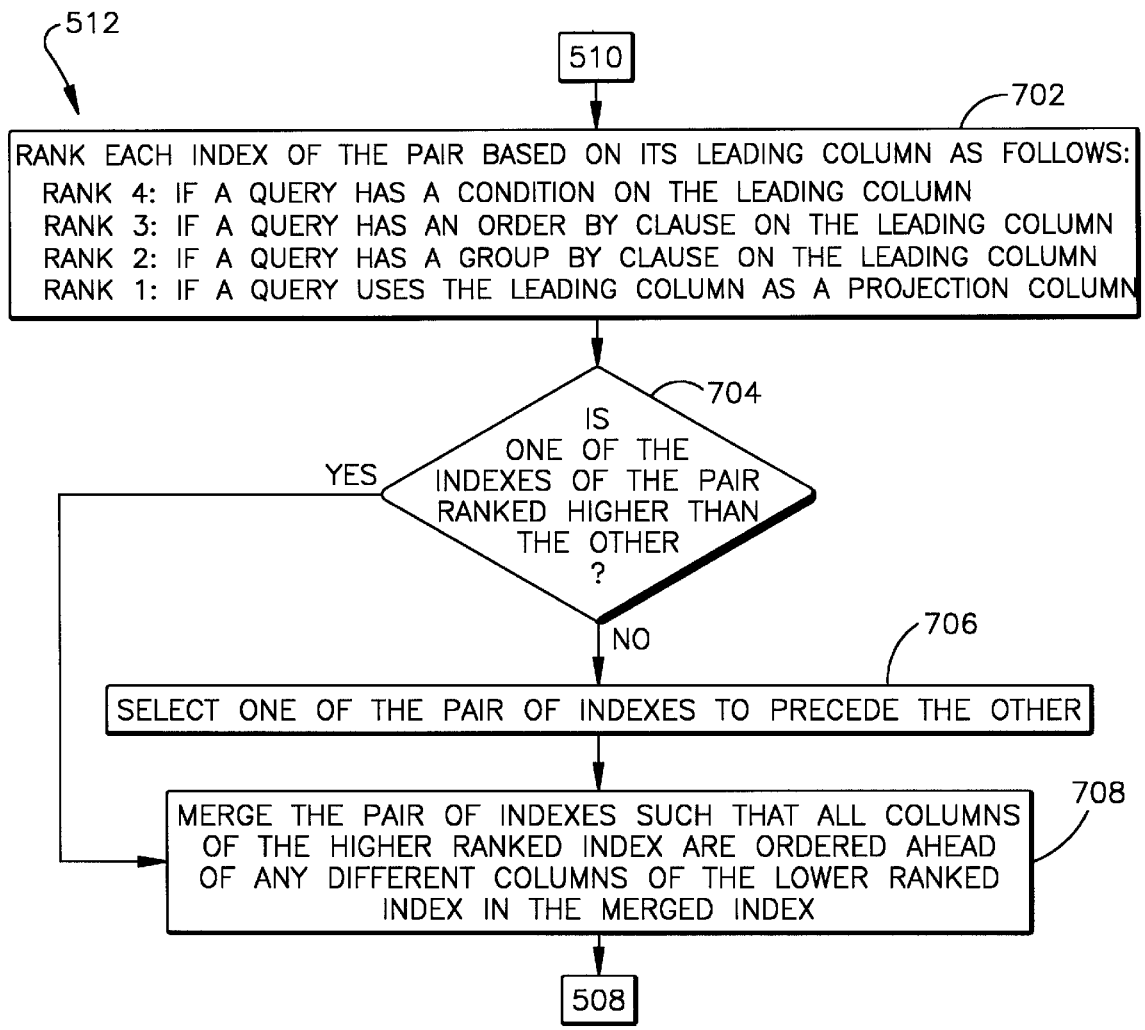
FIG. 7 illustrates, for one embodiment, a flow diagram for merging a pair of indexes to form a merged index for the flow diagram of FIG. 5.

For step 702 of FIG. 7, merge pair tool 330 assigns a rank for each index I1 and I2 to determine how to merge the indexes I1 and I2. Merge pair tool 330 may rank each index I1 and I2 in any suitable manner and for one embodiment ranks each index I1 and I2 based on how the leading column of the index appears in one or more queries of workload W 306. Index merge control tool 320 for one embodiment identifies workload W 306 for merge pair tool 330, as illustrated in FIG. 3. Workload W 306 for another embodiment may be globally accessible within index merge tool 300 and therefore available to merge pair tool 330.

Merge pair tool 330 for one embodiment ranks each index I1 and I2 as the highest rank or rank 4 if one or more queries of workload W 306 has a condition such as a selection or join, for example, on the leading column of the index, as rank 3 if one or more queries of workload W 306 has an order by clause on the leading column of the index, as rank 2 if one or more queries of workload W 306 has a group by clause on the leading column of the index, and as rank 1 if one or more queries use the leading column of the index as a projection column. Merge pair tool 330 may rank any indexes that cannot be ranked under these four criteria as rank 0.

For step 704, merge pair tool 330 determines whether one of the indexes I1 and I2 is ranked higher than the other. The higher ranked index is to precede the lower ranked index in merging the indexes. If both indexes I1 and I2 are equally ranked as determined for step 704, merge pair tool 330 for step 706 selects one of the indexes I1 and I2 to be the higher ranked index. Merge pair tool 330 may select one of the indexes I1 and I2 in accordance with any suitable criteria and for one embodiment for step 706 may arbitrarily select one index of the pair to precede the other.

Merge pair tool 330 for step 708 merges the pair of indexes I1 and I2 with the higher ranked index preceding the lower ranked index as determined for steps 704 and 706. Merge pair tool 330 for one embodiment merges indexes I1 and I2 to form the merged index M such that all columns of the higher ranked index are ordered ahead of any different columns of the lower ranked index in the merged index M. Merge pair tool 330 for one embodiment appends any different columns of the lower ranked index in their original order to the one or more columns of the higher ranked index in forming the merged index M. Merge pair tool 330 merges indexes I1 and I2 in this manner to preserve the benefit of the presumptively more significant index and its ordering of columns as determined by the ranking of each index I1 and I2 relative to the other index. The resulting merged index M may also better facilitate the execution of other queries of workload W 306.

As one example where index I1 is [a,e,c], index I2 is [b,c,d], and workload W 306 has a query having an order by clause on column a, a query having a condition on column b, and no queries having a condition on column a, merge pair tool 330 for step 702 ranks index I1 as rank 3 and index I2 as rank 4 and therefore determines for step 704 that index I2 is to precede index I1. Merge pair tool 330 for step 708, then, merges indexes I1 and I2 to produce the resulting merged index M as [b,c,d,a,e].

Upon merging indexes I1 and I2 for step 708, merge pair tool 300 returns the resulting merged index M to index merge control tool 320 as illustrated in FIG. 3, and index merge control tool 320 adds the merged index M to the current set of merged indexes.

Index merge control tool 320 repeats steps 508, 510, and 512 of FIG. 5 until each possible pair of indexes of the subset It have been evaluated for merging as determined for step 508. Index merge control tool 320 for step 514 then determines whether the current set of merged indexes comprises any merged indexes. If so, index merge control tool 320 for step 516 selects from the current set of merged indexes the merged index that saves the most storage space and for step 518 replaces the two indexes parent to the selected merged index with the selected merged index in the subset It to form a merged subset of indexes It. Index merge control tool 320 for one embodiment for step 516 determines the difference in size between the storage space consumed by each merged index of the current set of merged indexes and the sum of the storage space consumed by each index parent to the merged index and selects the merged index having the largest difference in storage space size as compared to its parent indexes. Index merge control tool 320 for other embodiments may use other suitable criteria for selecting the merged index for replacement in the subset It.

Index merge control tool 320 then repeats steps 506–518 to evaluate pairs of indexes of the current merged subset It and select a merged index to replace its parent pair of indexes in the current subset It. Index merge control tool 320 repeats steps 506–518 until no indexes of the current subset It can be merged as determined for step 514. Index merge control tool 320 may determine no indexes of the current subset $I_t$ can be merged for step 514 because the current subset It contains only one index on the identified table t or because none of the pairs of indexes identified for step 508 should be merged as determined for step 510.

For each iteration of steps 506–518, index merge control tool 320 for one embodiment may clear the current set of merged indexes and evaluate for steps 508–512 all possible pairs of indexes of the current subset $I_t$.

Because index merge control tool 320 may have already evaluated one or more pairs of indexes of the current subset $I_t$ for steps 508–512 of a prior iteration of steps 506–518, index merge control tool 320 for another embodiment may retain in the current set of merged indexes, for each iteration of steps 506–518, any merged indexes resulting from the prior evaluation of any pairs of indexes of the current subset $I_t$. Index merge control tool 320 may then evaluate for steps 508–512 of the current iteration of steps 506–518 only those pairs of indexes containing the merged index selected for step 516 from the just prior iteration of steps 506–518.

Because index merge control tool 320, in repeating steps 506–518, may merge one or more indexes that resulted from the merging of indexes for a prior iteration of steps 506–518, index merge control tool 320 effectively identifies and merges one or more combinations of two or more indexes on the same table of database 210. Instead of merging indexes one pair at a time, index merge control tool 320 for other embodiments for steps 508–512 may evaluate some other suitable number of indexes for merging.

If the current set of merged indexes does not comprise any merged indexes as determined for step 514, index merge control tool 320 proceeds to step 504 to identify another table t that is indexed by indexes of the subset I 312 and repeats steps 506–518 to merge indexes of the subset of indexes It on the currently identified table t.

Index merge control tool 320 repeats steps 504–518 to merge indexes of the subset of indexes It on each table t identified for step 504 until the indexes of the subset I 312 on every table indexed by the subset I 312 have been evaluated as determined for step 504. Index merge control tool 320 for step 520 then forms the merged set of indexes S' as the union of indexes of the subset of indexes It over each table t and any indexes of the set of indexes S 304 not in the subset of indexes I 312.

So long as index merge tool 300 merges at least two indexes of the set of indexes S 304 to form the merged set of indexes S', the merged set of indexes S' will consume less storage space than that consumed by the set of indexes S 304. Index merge tool 300 may therefore use the merged set of indexes S' as index configuration 302 to help minimize the amount of storage space consumed by the indexes used to execute queries against database 210.

The reduction in storage space using the merged set of indexes S' as index configuration 302 may, however, increase the cost in executing queries of workload W 306 against database 210. Index merge control tool 320 for one embodiment therefore determines whether to use the merged set of indexes S' as index configuration 302 by weighing the amount of storage space saved using the merged set of indexes S' against the increase in cost to execute queries of workload W 306 against database 210 using the merged set of indexes S'.

Referring to FIG. 4, index merge control tool 320 for step 404 determines whether the amount of storage space consumed by the merged set of indexes S' is at least a predetermined percentage f lower than that consumed by the set of indexes S 304, where f is a storage improvement factor 322 as illustrated in FIG. 3. That is, index merge control tool 320 for step 404 determines whether:

$$\frac{\text{storage}(S) - \text{storage}(S')}{\text{storage}(S)} \geq f$$

where storage(S) is the amount of storage space consumed by the set of indexes S 304 and storage(S') is the amount of storage space consumed by the merged set of indexes S'. Storage improvement factor f 322 may be any suitable number and for one embodiment is approximately 0.15 or 15%. Storage improvement factor f 322 for one embodiment may be defined by a user of index merge tool 300.

For step 406 of FIG. 4, index merge control tool 320 determines whether an estimated cost to execute the queries of workload W 306 for the merged set of indexes S' is less than or equal to a predetermined percentage c greater than an estimated cost to execute the queries of workload W 306 for the set of indexes S 304, where c is a workload cost-increase factor 324 as illustrated in FIG. 3. That is, index merge control tool 320 for step 406 determines whether:

$$\frac{\text{cost}(W, S') - \text{cost}(W, S)}{\text{cost}(W, S)} \leq c$$

where cost(W,S') is the estimated cost of workload W 306 for the merged set of indexes S' and cost(W,S) is the estimated cost of workload W 306 for the set of indexes S 304. Cost-increase factor c 324 may be any suitable number and for one embodiment is approximately 0.20 or 20%. Cost-increase factor c 324 for one embodiment may be defined by a user of index merge tool 300.

Index merge control tool 320 for one embodiment invokes query optimizer 240 of database server 220 to determine the estimated cost to execute the queries of workload W 306 against database 210 for the set of indexes S 304. Index merge control tool 320 for one embodiment may present to query optimizer 240 the queries of workload W 306 and the set of indexes S 304. Query optimizer 240 estimates a cost to execute each query of workload W 305 for the set of indexes S 304 and returns to index merge control tool 320 an execution plan comprising the cost estimate of each query of workload W 306 for the set of indexes S 304. Index merge control tool 320 for one embodiment may then determine the estimated cost of workload W 306 for the set of indexes S 304 as the sum of the cost estimates of each query of workload W 306 for the set of indexes S 304. Index merge control tool 320 may determine the estimated cost of workload W 306 for the merged set of indexes S' similarly as for the set of indexes S 304. Index merge control tool 320 for one embodiment invokes query optimizer 240 in a no-execution mode so as to request from query optimizer 240 only cost estimates of queries for index configurations.

Query optimizer 240 uses statistical information for each index of an index configuration to estimate costs of queries for that index configuration. Database server 220 gathers this statistical information for indexes currently existing in database server 220 and stores this statistical information as existing index entries 233 in catalog table 232. Because one or more merged indexes of the merged set of indexes S' may not currently exist in database server 220, index merge control tool 320 for one embodiment invokes database server 220 to simulate the presence of such absent indexes by gathering statistical information for the absent indexes and storing this statistical information as what-if index entries 234 in catalog table 232. For one embodiment, what-if index entries 234 are stored similarly as existing index entries 233 only what-if index entries 234 are marked with what-if index tags to distinguish what-if index entries 234 from existing index entries 233. Catalog table 232, existing index entries 233, and what-if index entries 234 may be implemented in the form of one or more suitable data structures and may also be stored on any suitable computer-readable medium.

Index merge control tool 320 and database server 220 may create what-if index entries 234 in any suitable manner. For one embodiment, index merge control tool 320 may invoke database server 220 to create what-if index entries 234 as described in U.S. patent application Ser. No. 08/912,036, U.S. Pat. No. 5,950,186, U.S. patent application Ser. No. 08/980,830, U.S. Pat. No. 5,960,423, U.S. patent application Ser. No. 08/982,046, U.S. Pat. No. 5,913,207, U.S. patent application Ser. No. 08/980,831, U.S. Pat. No. 5,913,206, and U.S. patent application Ser. No. 08/980,829, U.S. Pat. No. 5,926,813. Briefly, index merge control tool 320 may designate a table t of database 210 and one or more columns of the table t for the what-if index to be created. Database server 220 may then sample a percentage of the pages of the designated table t and sort the rows of the sampled pages by the designated one or more columns of the table t to generate the statistical information for the what-if index.

If the amount of storage space consumed by the merged set of indexes S' is at least the predetermined percentage f less than that consumed by the set of indexes S 304 as determined for step 404 and if the estimated cost to execute the queries of workload W 306 for the merged set of indexes S' does not exceed the estimated cost to execute the queries of workload W 306 for the set of indexes S 304 by more than the predetermined percentage c as determined for step 406, index merge control tool 320 for step 408 uses the merged set of indexes S' as index configuration 302. If, however, the amount of storage space consumed by the merged set of indexes S' is not at least the predetermined percentage f less than that consumed by the set of indexes S 304 or if the estimated cost to execute the queries of workload W 306 for the merged set of indexes S' exceeds the estimated cost to execute the queries of workload W 306 for the set of indexes S 304 by more than the predetermined percentage c, index merge control tool 320 for step 410 uses the set of indexes S 304 as index configuration 302.

Index merge control tool 320 may determine whether to use the set of indexes S 304 or the merged set of indexes S' as index configuration 302 using either one or both of the criteria for steps 404 and 406. Index merge control tool 320 may perform steps 404 and 406 in any order. Index merge control tool 320 may also determine whether to use the set of indexes S 304 or the merged set of indexes S' as index configuration 302 using either one or both of these criteria in combination with any other suitable criteria.

In the foregoing description, the invention has been described with reference to specific exemplary embodiments thereof It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method form merging indexes for use in executing queries against a database, the method comprising the steps of:
    (a) identifying at least two indexes that meet a merge criteria from an initial set of indexes; and
    (b) merging the identified at least two indexes to form a merged index set consuming less storage space than for the initial set of indexes.

2. The method of claim 1, comprising the step of:
    (c) using the merged index set to execute queries against the database if the storage space consumed by the merged index set is at least a predetermined percentage less than that for the initial set of indexes.

3. The method of claim 1, comprising the step of:
    (c) using the merged index set to execute queries against the database if an estimated cost to execute queries of a workload for the merged index set is less than a predetermined percentage greater than an estimated cost to execute the queries of the workload for the initial set of indexes.

4. The method of claim 1, comprising the step of:
(c) using the merged index set to execute queries against the database if the storage space consumed by the merged index set is at least a predetermined percentage less than that for the initial set of indexes and if an estimated cost to execute queries of a workload for the merged index set is less than a predetermined percentage greater than an estimated cost to execute the queries of the workload for the initial set of indexes.

5. The method of claim 1, wherein the identifying step (a) comprises the step of identifying from the initial set of indexes one or more combinations of two or more indexes on the same table of the database; and
wherein the merging step (b) comprises the step of merging each identified combination of indexes.

6. The method of claim 5, wherein the identifying step (a) and the merging step (b) comprise the steps of identifying and merging each identified combination of indexes by identifying and merging one pair of indexes on the same table of the database at a time to form a respective merged index.

7. The method of claim 6, wherein the merging step (b) comprises the step of merging each identified pair of indexes such that all columns of one index of the identified pair are ordered ahead of any different columns of the other index of the identified pair to form the respective merged index.

8. The method of claim 6, wherein the merging step (b) comprises the steps of determining how the indexes of each identified pair rank against one another and determining an order of columns for each respective merged index based on the determined ranking for the indexes of the identified pair used to form the respective merged index.

9. The method of claim 6, wherein the identifying step (a) comprises the step of identifying only pairs of indexes that will form a merged index having a width less than a predetermined percentage greater than that for each index of the pair used to form the merged index.

10. The method of claim 6, wherein the identifying step (a) comprises the step of identifying only pairs of indexes:
(i) where the initial set of indexes comprises a single-column index on a leading column of both indexes of the pair and the leading column of each index of the pair are the same, or
(ii) where the initial set of indexes comprises a single-column index on only one or none of the leading columns of the indexes of the pair.

11. The method of claim 1, wherein the identifying step (a) comprises the steps of
(i) identifying, from the initial set of indexes a subset of indexes each having a width of at least a predetermined number of column(s), and
(ii) identifying the at least two indexes from the identified subset of indexes.

12. The method of claim 1, wherein the identifying step (a) comprises the steps of
(i) identifying from the initial set of indexes a subset of indexes for index-only access, and
(ii) identifying the at least two indexes from the identified subset of indexes.

13. A computer readable medium having computer-executable instructions for performing the steps of claim 1.

14. A computer readable medium having computer-executable instructions for performing the steps of claim 2.

15. A computer readable medium having computer-executable instructions for performing the steps of claim 3.

16. A computer readable medium having computer-executable instructions for performing the steps of claim 5.

17. A method for merging indexes for use in executing queries against a database, the method comprising the steps of:
(a) identifying from an initial set of indexes a subset of indexes that meet a merge criteria on one table of the database;
(b) merging each of one or more combinations of indexes from the identified subset of indexes to form a set of one or more respective merged indexes;
(c) selecting a merged index from the set of one or more merged indexes;
(d) replacing the combination of indexes used to form the selected merged index with the selected merged index; and
(e) repeating steps (b), (c), and (d) one or more times.

18. The method of claim 17, wherein the selecting step (c) comprises the step of selecting from the set of one or more merged indexes the merged index that saves the most storage space.

19. The method of claim 17, comprising the step of:
(f) repeating steps (a), (b), (c), (d), and (e) for each of one or more other tables of the database on which the initial set of indexes are indexed to form a merged index set.

20. The method of claim 19, comprising the step of:
(g) using the merged index set to execute queries against the database if storage space consumed by the merged index set is at least a predetermined percentage less than that for the initial set of indexes.

21. The method of claim 19, comprising the step of:
(g) using the merged index set to execute queries against the database if an estimated cost to execute queries of a workload for the merged index set is less than a predetermined percentage greater than an estimated cost to execute the queries of the workload for the initial set of indexes.

22. The method of claim 19, comprising the step of:
(g) using the merged index set to execute queries against the database if storage space consumed by the merged index set is at least a predetermined percentage less than that for the initial set of indexes and if an estimated cost to execute queries of a workload for the merged index set is less than a predetermined percentage greater than an estimated cost to execute the queries of the workload for the initial set of indexes.

23. The method of claim 17, wherein each combination of indexes is a pair of indexes.

24. The method of claim 17, wherein the merging step (b) comprises the step of merging each combination of indexes such that all columns of one index of the combination are ordered ahead of any different columns of the other index (es) of the combination to form the respective merged index.

25. The method of claim 17, wherein the merging step (b) comprises the steps of:
(i) determining how the indexes of each combination rank against one another, and
(ii) determining an order of columns for each respective merged index based on the determined ranking for the indexes of the combination used to form the respective merged index.

26. The method of claim 25, wherein the determining step (b)(i) comprises the step of determining how the indexes of each combination rank against one another based on how a leading column of each index of the combination appears in one or more queries.

27. The method of claim 26, wherein the determining step (b)(i) comprises the step of ranking each index of each combination with a highest rank if one or more queries have a condition on the leading column of the index, with a second highest rank if one or more queries have an order by clause on the leading column of the index, with a third highest rank if one or more queries have a group by clause on the leading column of the index, and with a fourth highest rank if one or more queries use the leading column of the index as a projection column.

28. The method of claim 17, wherein the merging step (b) comprises the step of merging only combinations of indexes that form a merged index having a width less than a predetermined percentage greater than that for each index of the combination used to form the merged index.

29. The method of claim 17, wherein the merging step (b) comprises the step of merging only combinations of indexes:
 (i) where the initial set of indexes comprises a single-column index on a leading column of at least two indexes of the combination and the leading column of those at least two indexes of the combination are the same, or
 (ii) where the initial set of indexes comprises a single-column index on only one or none of the leading columns of the indexes of the combination.

30. The method of claim 17, wherein the identifying step (a) comprises the steps of:
 (i) identifying from the initial set of indexes an initial subset of indexes each having a width of at least a predetermined number of column(s), and
 (ii) identifying the subset of indexes on one table of the database from the initial subset of indexes.

31. The method of claim 17, wherein the identifying step (a) comprises the steps of:
 (i) identifying from the initial set of indexes an initial subset of indexes for index-only access, and
 (ii) identifying the subset of indexes on one table of the database from the initial subset of indexes.

32. A computer readable medium having computer-executable instructions for performing the steps of claim 17.

33. A computer readable medium having computer-executable instructions for performing the steps of claim 19.

34. A computer readable medium having computer-executable instructions for performing the steps of claim 20.

35. A computer readable medium having computer-executable instructions for performing the steps of claim 21.

36. A method for merging a pair of indexes that meet a merge criteria to form a merged index for use in executing queries against a database, the method comprising the steps of
 (a) selecting one of the indexes of the pair to precede the other index of the pair; and
 (b) merging the pair of indexes such that all columns of the selected index are ordered ahead of any different columns of the other index of the pair to form the merged index.

37. The method of claim 36, wherein the selecting step (a) comprises the steps of:
 (i) determining how the indexes of the pair rank against one another, and
 (ii) selecting the index of the pair that ranks higher against the other index of the pair.

38. The method of claim 37, wherein the determining step (a)(i) comprises the step of determining how the indexes of the pair rank against one another based on how a leading column of each index of the pair appears in one or more queries.

39. The method of claim 38, wherein the determining step (a)(i) comprises the step of ranking each index of the pair with a highest rank if one or more queries have a condition on the leading column of the index, with a second highest rank if one or more queries have an order by clause on the leading column of the index, with a third highest rank if one or more queries have a group by clause on the leading column of the index, and with a fourth highest rank if one or more queries use the leading column of the index as a projection column.

40. A computer readable medium having computer-executable instructions for performing the steps of claim 36.

* * * * *